United States Patent
Chen et al.

(10) Patent No.: US 10,324,105 B2
(45) Date of Patent: Jun. 18, 2019

(54) MECHANICAL LOW PASS FILTER FOR MOTION SENSORS

(71) Applicant: Apple Inc., Cupertino, CA (US)

(72) Inventors: Kuan-Lin Chen, Sunnyvale, CA (US); Yun-Ju Lai, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 14/866,378

(22) Filed: Sep. 25, 2015

(65) Prior Publication Data
US 2017/0089942 A1    Mar. 30, 2017

(51) Int. Cl.
| | |
|---|---|
| G01P 15/00 | (2006.01) |
| G01P 1/00 | (2006.01) |
| G01P 1/02 | (2006.01) |
| G01P 15/08 | (2006.01) |
| G01C 19/5783 | (2012.01) |
| G01P 15/02 | (2013.01) |

(52) U.S. Cl.
CPC ...... *G01P 15/0802* (2013.01); *G01C 19/5783* (2013.01); *G01P 15/08* (2013.01); *G01P 1/003* (2013.01); *G01P 2015/0882* (2013.01)

(58) Field of Classification Search
CPC .................. G01P 2015/0882; G01P 1/003
See application file for complete search history.

(56) References Cited

U.S. PATENT DOCUMENTS

| | | | |
|---|---|---|---|
| 2002/0011117 A1* | 1/2002 | Orsier | B81B 3/0051 73/860 |
| 2004/0255675 A1* | 12/2004 | Selvakumar | G01P 15/0802 73/526 |
| 2008/0098814 A1* | 5/2008 | Platt | G01C 19/5719 73/504.02 |
| 2009/0320593 A1 | 12/2009 | Nakashio et al. | |
| 2012/0048018 A1* | 3/2012 | Hammer | G01C 19/5712 73/504.12 |
| 2013/0194770 A1 | 8/2013 | Bernstein et al. | |
| 2013/0199295 A1* | 8/2013 | Hoefer | H05K 1/141 73/526 |
| 2014/0352431 A1* | 12/2014 | Leclerc | G01C 19/5712 73/504.04 |
| 2015/0346232 A1* | 12/2015 | Pruksch | F16F 15/04 73/493 |
| 2016/0291050 A1* | 10/2016 | Ehrenpfordt | G01C 19/5783 |

OTHER PUBLICATIONS

Kuznetsova, Anya, et al. "Enhancement of adsorption inside of single-walled nanotubes: opening the entry ports." Chemical Physics Letters 321.3-4 (2000): 292-296.*

* cited by examiner

*Primary Examiner* — Son T Le
*Assistant Examiner* — Herbert K Roberts
(74) *Attorney, Agent, or Firm* — Fish & Richardson P.C.

(57) ABSTRACT

Mechanical low pass filters for motion sensors and methods for making same are disclosed. In some implementations, a motion sensor package comprises: a substrate; one or more mechanically compliant dampers formed on the substrate; one or more mechanically compliant metal springs formed on the one or more dampers and the substrate; and a sensor stack attached to the one or more metal springs, wherein the one or more metal springs and dampers provide a mechanical suspension system having a resonant frequency that is higher than a sensing bandwidth of a motion sensor in the sensor stack and lower than a resonant frequency of the motion sensor.

22 Claims, 9 Drawing Sheets

MECHANICAL LOW PASS FILTER FOR MOTION SENSORS

TECHNICAL FIELD

This disclosure relates generally to integrated circuit (IC) packaging.

BACKGROUND

Motion sensors in consumer electronics are subjected to interference due to their integration into compact and highly complex systems, such as smart phones, electronic tablets and wearable devices. In particular, mechanical vibrations from speakers, vibrators or other system components can impact the desired motion signal by inducing noise and error in the motion sensor output. Moreover, the resonance behaviors of the motion sensor can amplify the mechanical vibrations further increasing the noise and error in motion sensor output.

A conventional approach to address this issue is to implement an electrical low-pass filter at the output of the sensor to attenuate the signal that is out of a defined bandwidth (BW) of the motion sensor. The electrical low-pass filter, however, may not be sufficient and consumes power which limits its utility in low power applications.

SUMMARY

Mechanical low pass filters for motion sensors and methods for making same are disclosed.

In some implementations, a motion sensor package comprises: a substrate; one or more mechanically compliant dampers formed on the substrate; one or more mechanically compliant metal springs formed on the one or more dampers and the substrate; and a sensor stack attached to the one or more metal springs, wherein the one or more metal springs and dampers provide a mechanical suspension system having a resonant frequency that is higher than a sensing bandwidth of a motion sensor in the sensor stack and lower than a resonant frequency of the motion sensor.

In some implementations, a method of fabricating a mechanical suspension system for a motion sensor package comprises: dispensing damping material on the substrate; curing the damping material; patterning the damping material to form one or more dampers; depositing a first photoresist layer on the cured and patterned damping material with a thickness that is greater than a thickness of the damping material; patterning the first photoresist layer to define opening areas; developing the first photoresist layer and etch away unwanted areas; depositing a seed layer onto the patterned first photoresist layer; depositing a second layer of photoresist on the seed layer; patterning the second layer of photoresist to define a metal spring pattern; developing the second photoresist layer and etch away unwanted areas; depositing a metal layer of a defined thickness on the seed layer to form the metal spring; removing the second layer of photoresist; removing the seed layer; and removing the first photoresist layer to release the metal spring.

In some implementations, an apparatus comprises: a motion sensor including: a substrate; one or more mechanically compliant dampers formed on the substrate; one or more mechanically compliant metal springs formed on the one or more dampers and the substrate; a sensor stack attached to the one or more metal springs, wherein the one or more metal springs and dampers provide a mechanical suspension system having a resonant frequency that is higher than a sensing bandwidth of a motion sensor in the sensor stack and lower than a resonant frequency of the motion sensor; a processor coupled to the motion sensor; and memory coupled to the processor and configured to store instructions, which when executed by the processor, causes the processor to perform operations comprising: obtaining a motion signal from the motion sensor; and determining one or more of position, velocity, speed or orientation of the apparatus based at least in part on the motion signal.

Particular implementations disclosed herein provide one or more of the following advantages. A mechanical low pass filter utilizing a mechanical suspension system is built into a sensor package. The mechanical suspension system isolates the motion sensor from out-of-band vibration and package strain and improves sensor stability.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

The disclosed implementations provide a mechanical low-pass filter for motion sensors to attenuate out-of-band vibrations (i.e., vibrations outside the bandwidth of the motion sensor). In some implementations, the mechanical low-pass filter is built into the package of the motion sensor by creating a mechanically compliant suspension system to attenuate vibration. The mechanically compliant suspension system is designed to have a resonant frequency that is higher than the sensing bandwidth of the motion sensor ($f_{sensor}$) but lower than the resonant frequency of the motion sensor (represented by response curve 102). In the examples that follow, the motion sensor is a micro-electrical-mechanical system (MEMS). Some example MEMS are a MEMS accelerometer for sensing acceleration and a MEMS gyro for sensing rotation rate.

Figure 1:
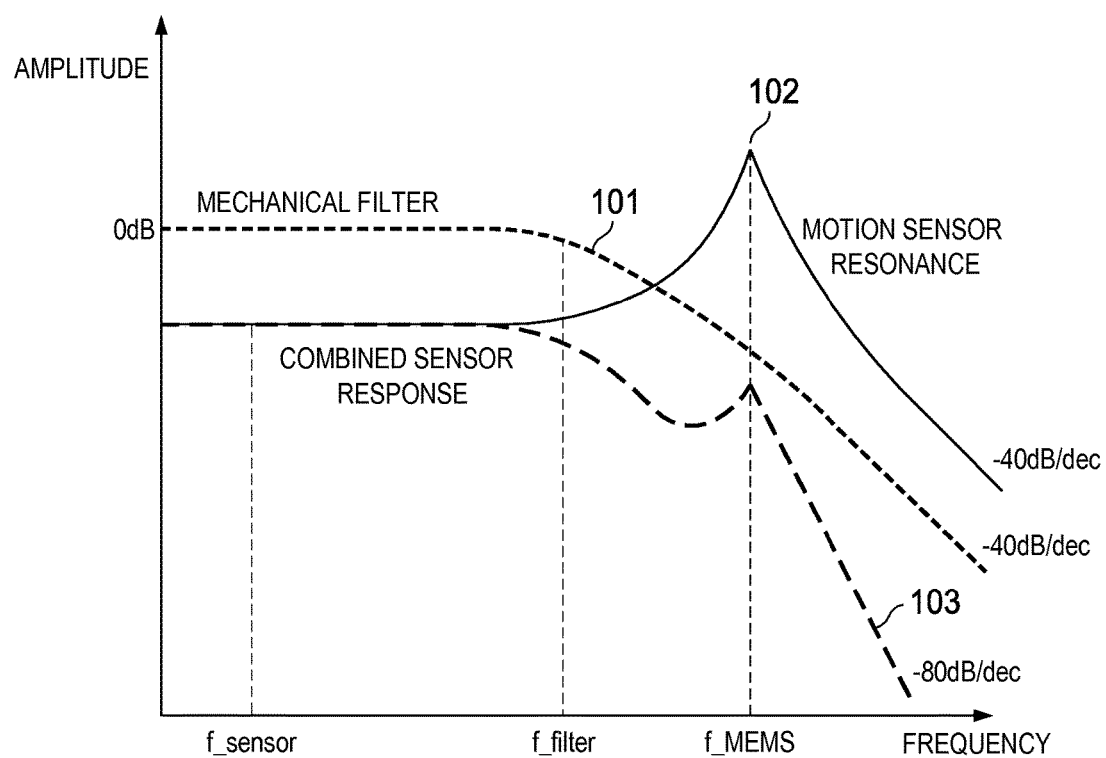
FIG. 1 is a plot showing frequency responses of a motion sensor, a mechanical filter and a combined sensor and filter.

FIG. 1 is a plot showing frequency responses of a motion sensor, a mechanical low pass filter and a combined sensor and filter. The mechanical suspension system disclosed herein and that is used to create the low-pass filter will provide a −40 dB/dec attenuation after input frequencies (vibration frequencies) pass the resonant frequency of the filter ($f_{filter}$). The combined sensor plus filter frequency response (represented by frequency response curve 103) will have an attenuated resonant peak at the resonant frequency of the motion sensor ($f_{MEMS}$). The combined sensor and filter frequency response (curve 103) has a steeper roll-off (−80 dB/dec) after $f_{MEMS}$. Moreover, the compliance of the mechanical suspension system will absorb most of the strain caused by the assembly process of the motion sensor package and improve the motion sensor stability.

Figure 2A:
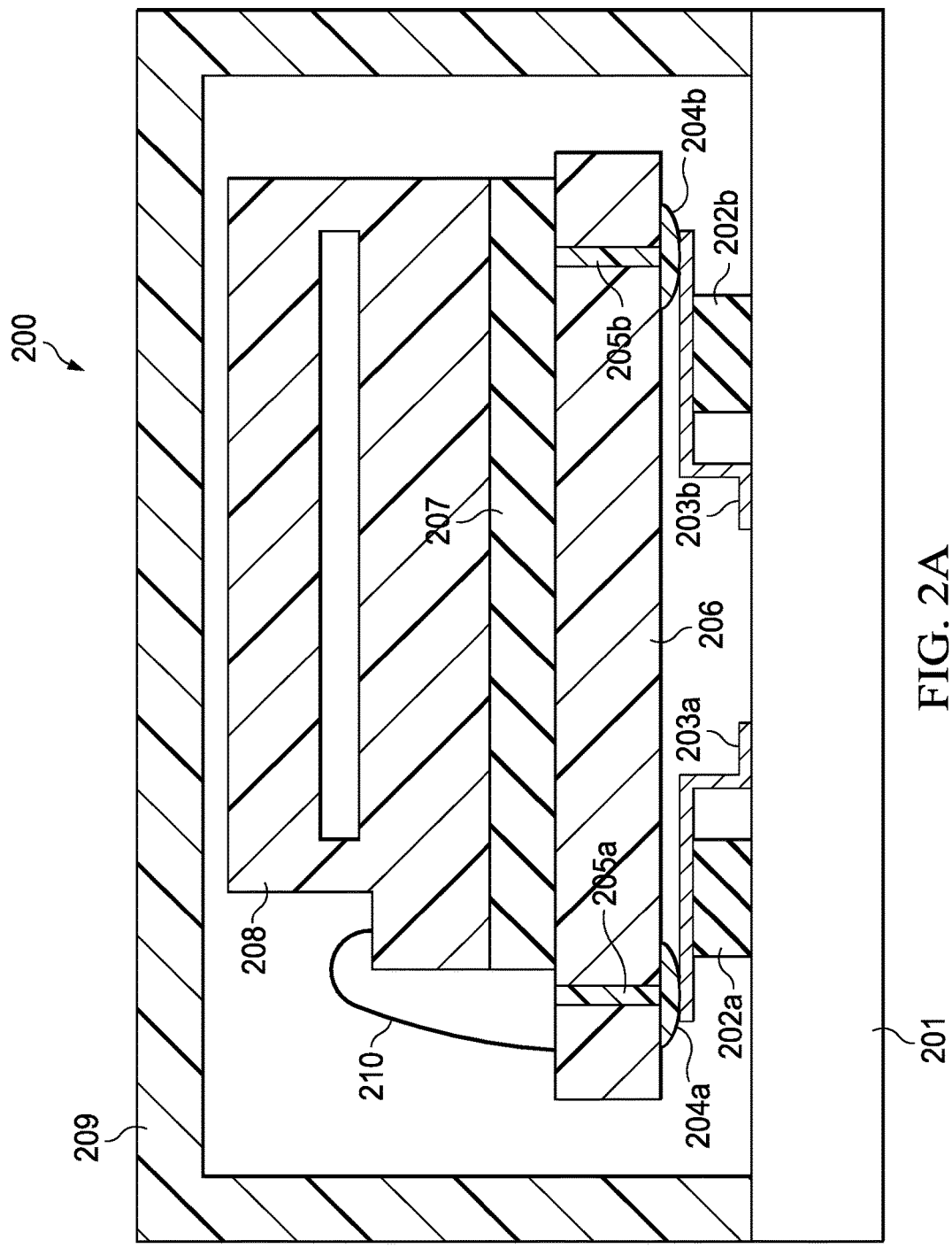
FIGS. 2A and 2B are cross-section views of example configurations of a mechanical low pass filter assembled into a package.
Figure 2B:
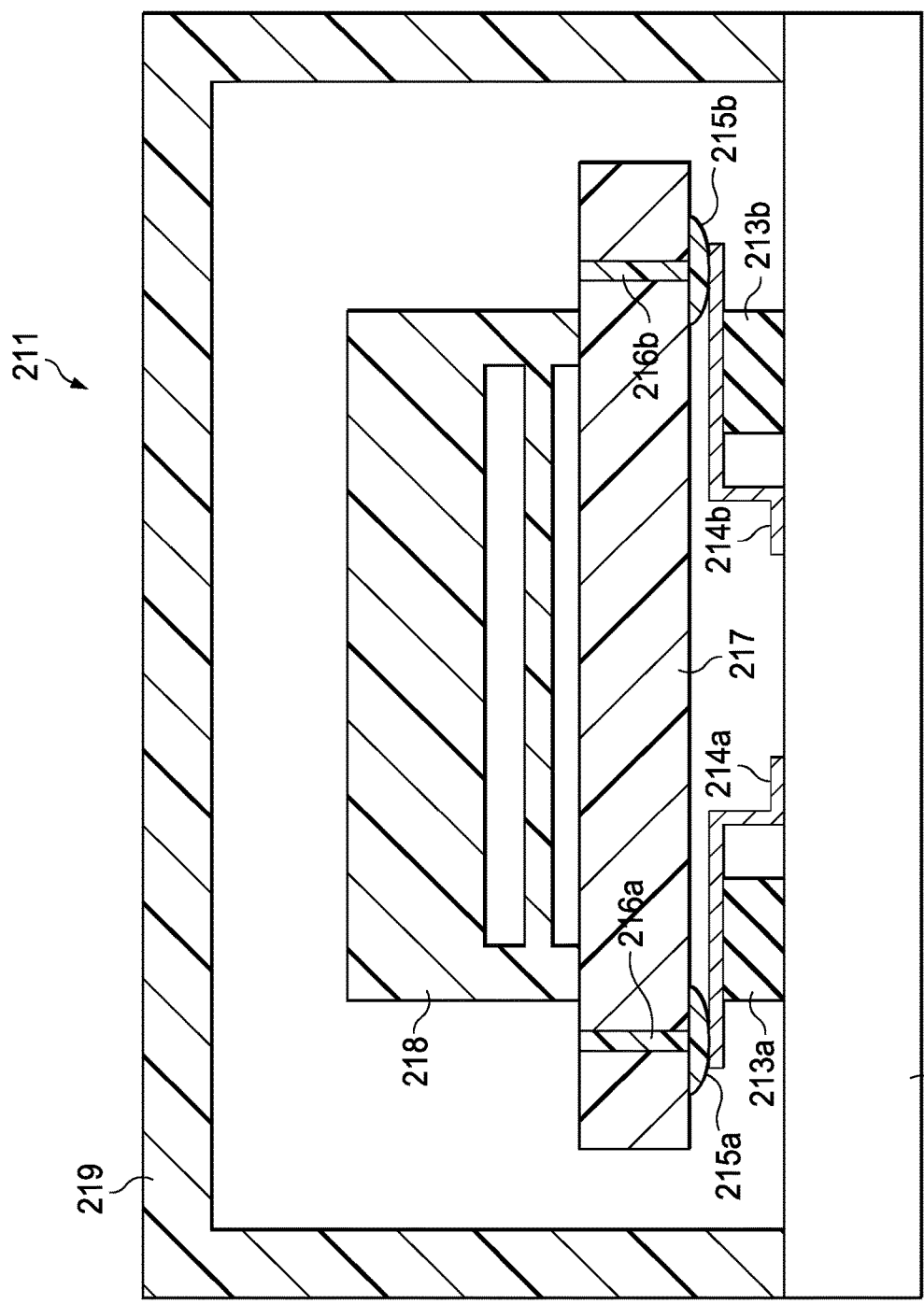

FIGS. 2A and 2B are cross-section views of example configurations of a mechanical low pass filter assembled into a package. FIG. 2A shows an example two-die MEMS device, where MEMS die 208 and an application specific integrated circuit (ASIC) die 206 are assembled into package 200. MEMS die 208 and ASIC die 206 are connected using bond wires 210. FIG. 2B shows an example single-die MEMS device, where MEMS 218 and integrated circuit 217 are monolithically integrated into a single die which is then assembled into package 211. A bond wire is not required to connect MEMS 218 to ASIC 217.

Referring to FIG. 2A, in some implementations package 200 includes substrate 201 (e.g., a ceramic substrate), dampers 202, metal springs 203, solder bumps 204, integrated circuit die 206, shock absorbing die-attachment film (DAF) 207, MEMS die 208 and package cover 209. The combination of integrated circuit die 206, DAF 207 and MEMS die 208 are also referred to herein as a sensor stack. The overall stiffness and quality factor Q of the mechanical suspension system is determined by the designs of metal springs 203 and mechanically compliant dampers 202. The damping coefficient is determined by the material properties, design and location of dampers 202 on substrate 201 relative to metal springs 203. Metal springs 203 can be shaped in a variety of ways as shown in FIGS. 5A-5H to achieve the desired low-pass filter characteristics shown in FIG. 1. Bond wires 210 electrically connect MEMS die 208 to integrated circuit die 206.

In this example implementation, metal springs 203 serve as both the mechanical suspension and electrical connection to package 200. In some implementations, through silicon vias (TSVs) 205 can be formed in integrated circuit die 206 to electrically connect integrated circuit die 206 to metal springs 203 through solder bumps 204. Metal springs 203 can be electrically coupled to package pads (not shown) to allow signals from integrated circuit die 206 to be output on one or more pins (not shown) of package 200.

Referring to FIG. 2B, in some implementations package 211 includes substrate 212 (e.g., a ceramic substrate), dampers 213, metal springs 214, solder bumps 215, integrated circuit 217, MEMS 218 and package cover 219. MEMS 218 and integrated circuit 217 are monolithically integrated into a single die which is then assembled into package 211. The single die is also referred to herein as a sensor stack. The overall stiffness and quality factor of the mechanical suspension system is determined by the designs of metal springs 214 and mechanically compliant dampers 213. The damping coefficient is determined by the material properties, design and location of dampers 213 on substrate 212 relative to metal springs 214. Metal springs 214 can be shaped in a variety of ways as shown in FIGS. 5A-5H to achieve the desired low-pass filter characteristics shown in FIG. 1.

In this example implementation, metal springs 214 serve as both the mechanical suspension and electrical connection to package 211. In some implementations, through silicon vias (TSVs) 216 can be formed in integrated circuit die 217 to electrically connect integrated circuit die 217 to metal springs 214 through solder bumps 215. Metal springs 214 can be electrically coupled to package pads (not shown) to allow signals from integrated circuit die 216 to be output on one or more pins (not shown) of package 211.

Figure 3:
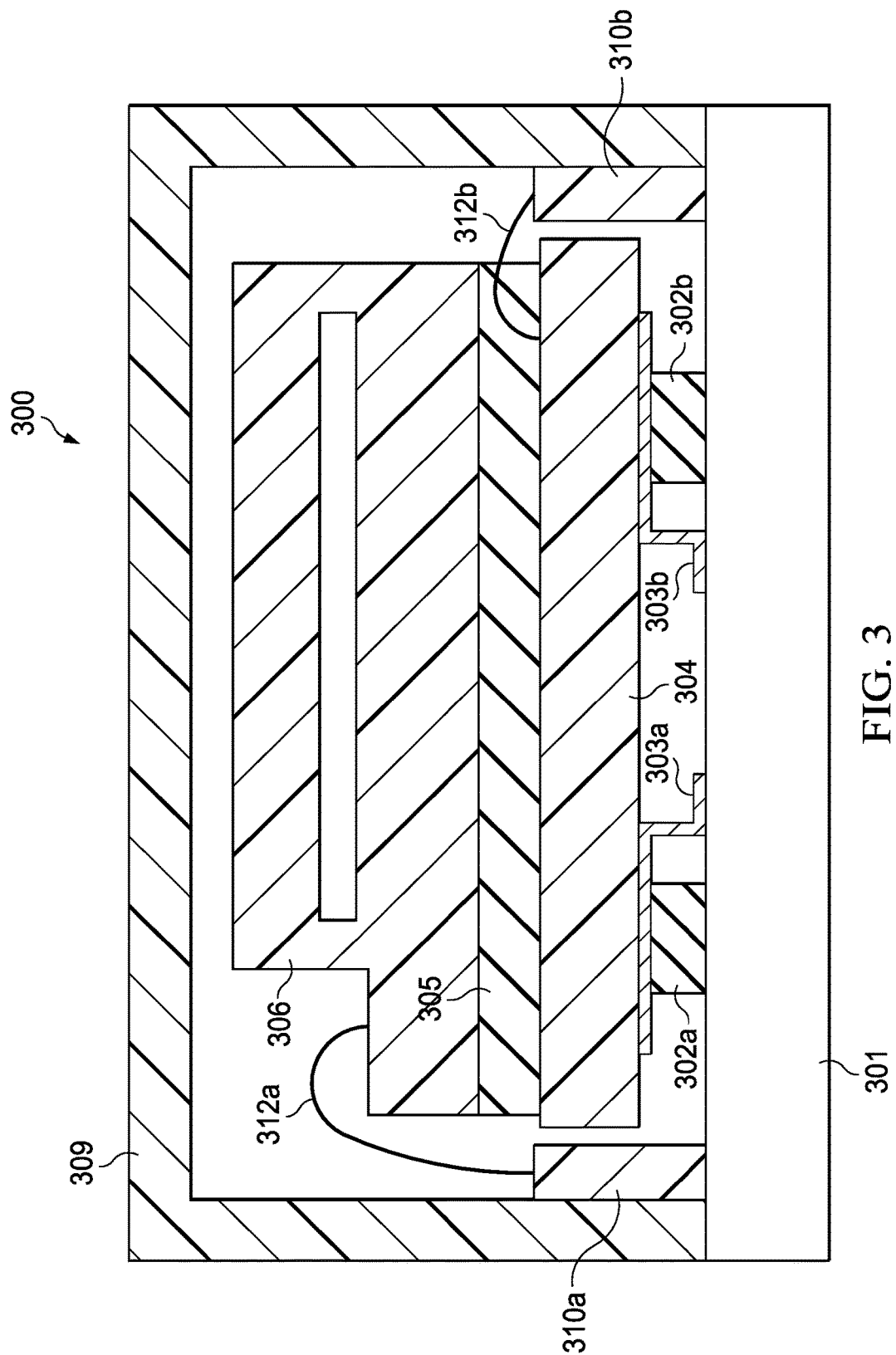
FIG. 3 is a cross-section view of an example alternate configuration of a mechanical low pass filter assembled into a package.

FIG. 3 is a cross-section view of a second example implementation of a mechanical low pass filter assembled into a package. Package 300 is better suited for devices with many electrical connections to the solder pads of package 300. In some implementations, package 300 includes substrate 301 (e.g., a ceramic substrate), dampers 302, metal springs 303, integrated circuit die 304, shock absorbing DAF 305, MEMS 306 and package cover 309. Like package 200, the overall stiffness and quality factor Q of the mechanical suspension system shown in FIG. 3 is determined by the designs of both metal springs 303 and dampers 302. The damping coefficient is determined by the design and location of dampers 302 on substrate 301 relative to metal springs 303. Metal springs 303 can be shaped in a variety of ways as shown in FIGS. 5A-5H to achieve the desired low-pass filter characteristics shown in FIG. 1. In some implementations, metal springs 303 are attached to integrated circuit die 304 by solder, conductive epoxy or silicone.

Unlike package 200 or 211, metal springs 303 are only used for mechanical suspension and not for electrical connections with package pads 310. In some implementations, wire bonds 312 electrically couple MEMS 306 and integrated circuit die 306 to package pads 310.

Figure 4A:
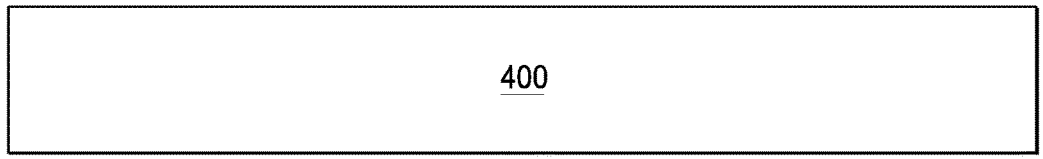
FIGS. 4A-4H is an example process flow for fabricating the mechanical suspension system shown in FIGS. 2 and 3.
Figure 4B:
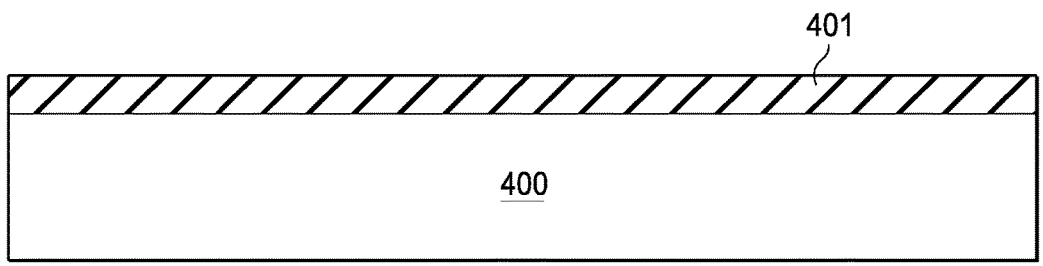
Figure 4C:
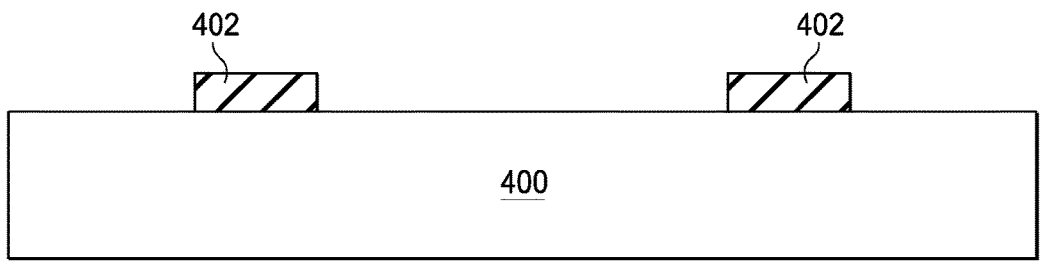

FIGS. 4A-4H is an example process flow for fabricating the mechanical suspension system shown in FIGS. 2 and 3. Referring to FIG. 4A, the process flow begins with a silicon wafer or general package substrate 400. Damping material 401 is dispensed on the top surface of wafer or substrate 400 with a defined thickness, as shown in FIG. 4B. Damping material 401 can be cured at an appropriate temperature. Damping material 401 is then patterned using, for example, a $CO_2$ laser to form dampers 402, as shown in FIG. 4C.

Figure 4D:
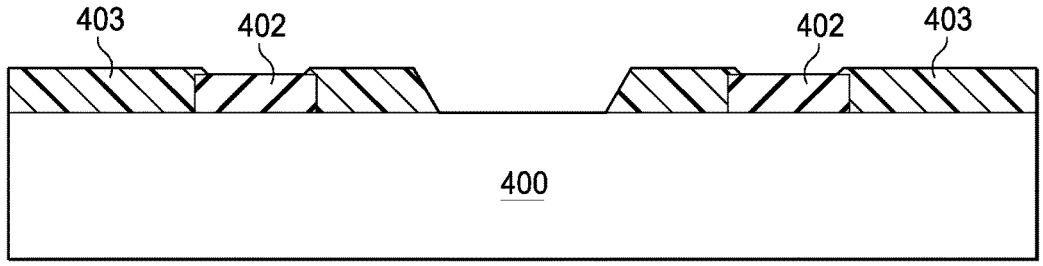

First photoresist layer 403 is deposited on the top surface of damping material 401 and silicon wafer or general package substrate 400 with a thickness that is greater than a thickness of damping material 401, as shown in FIG. 4D. First photoresist layer 403 is then patterned by photolithography technology to define opening areas. First photoresist layer 403 is then developed and unwanted areas are etched away.

Figure 4E:
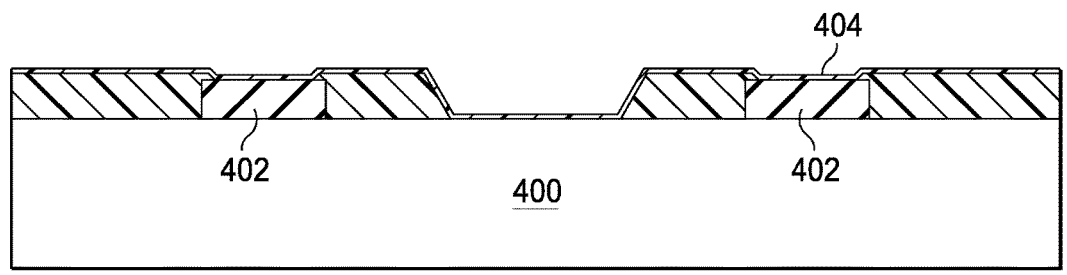
Figure 4F:
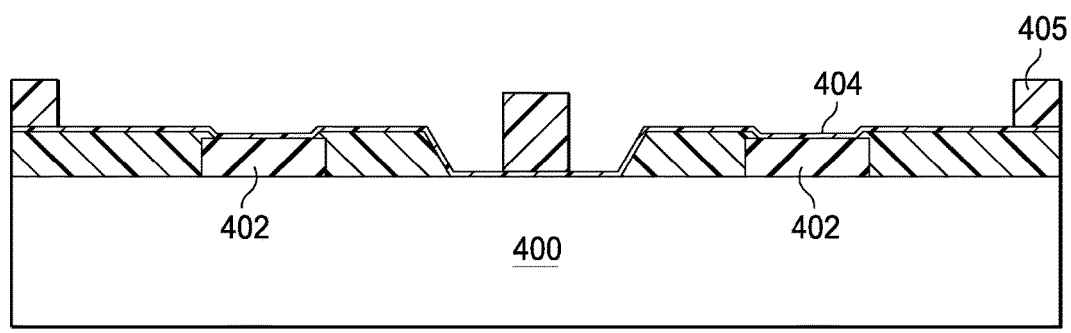

Seed layer 404 is deposited by physical vapor deposition (PVD) onto the top surface first photoresist layer 403, as shown in FIG. 4E. Second photoresist layer 405 is deposited on seed layer 404. The same lithographic technique used with first photoresist layer 403 is used with second photoresist layer 405 to define one or more metal spring patterns as shown in FIG. 4F.

Figure 4G:
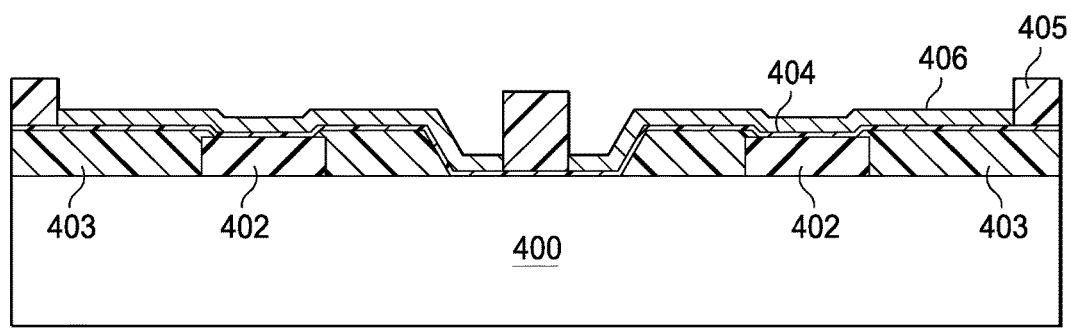
Figure 4H:
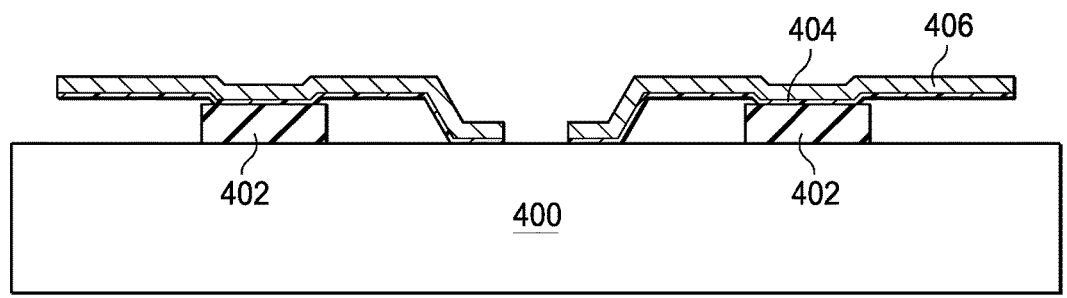

Metal layer 406 of defined thickness is electrode-plated onto seed layer 404 to form the metal spring as shown in FIG. 4G. Second photoresist layer 405 is removed by chemical etching and seed layer 404 is removed by sputtering or chemical etching. Lastly, first photoresist layer 403 is removed to release the metal spring, as shown in FIG. 4H.

Figure 5A:
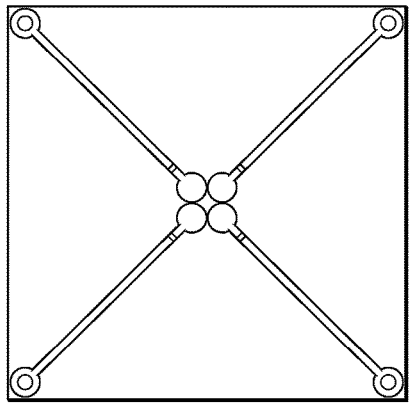
FIGS. 5A-5H are example metal spring patterns that provide the desired mechanical filter frequency response shown in FIG. 1.
Figure 5B:
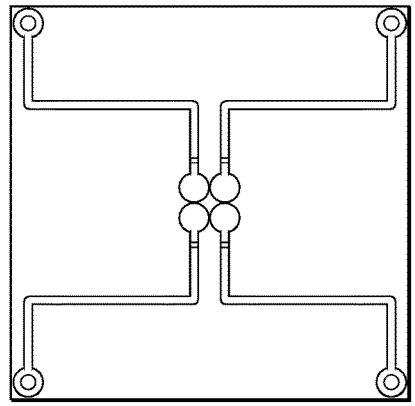
Figure 5C:
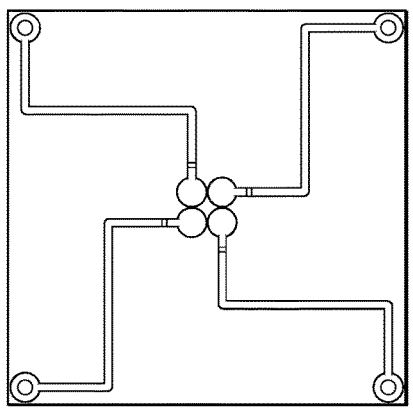
Figure 5D:
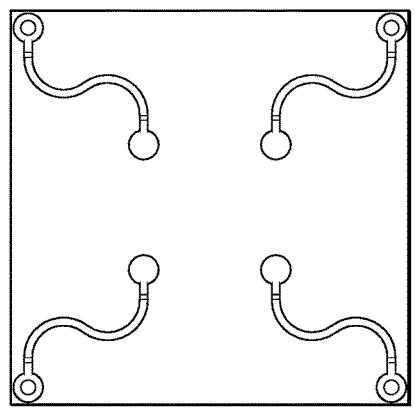
Figure 5E:
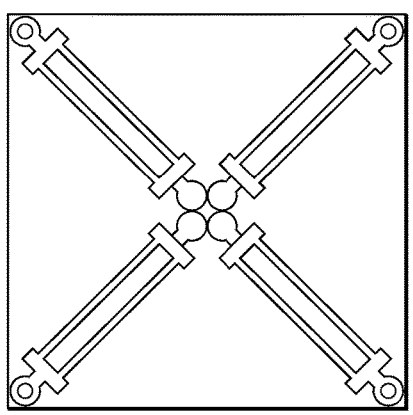
Figure 5F:
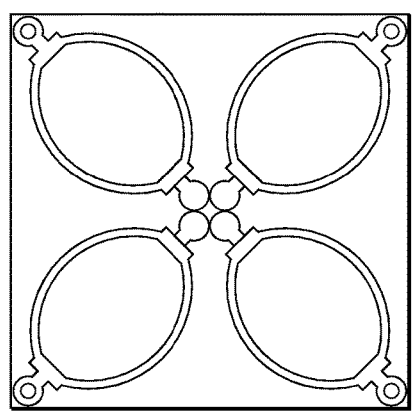
Figure 5G:
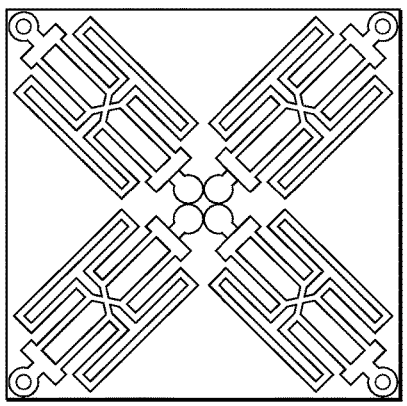
Figure 5H:
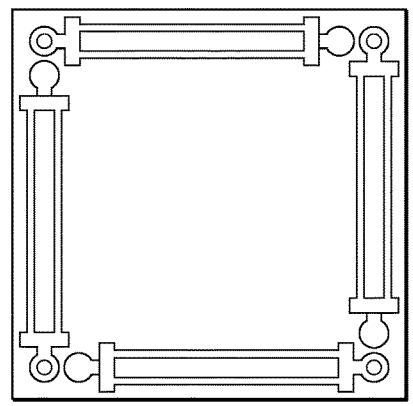

FIGS. 5A-5H are example metal spring patterns that help provide the desired mechanical filter frequency response shown in FIG. 1. A variety of metal spring patterns can be used to obtain the filter characteristics shown in FIG. 1. The example patterns shown in FIGS. 5A-5H were simulated using motion sensor silicon dimensions as the device to be vibration isolated to achieve the desired filter characteristics shown in FIG. 1, where the mechanical suspension system has a resonant frequency higher than the motion sensor bandwidth (e.g., 500 Hz) but lower than the resonant frequency (e.g., 1 KHz) of the motion sensor. Some examples of metal spring patterns that provide the desired filter characteristics include radial straight beam (FIG. 5A), radial L-shaped beam (FIG. 5B), radial asymmetric L-shaped beam (FIG. 5C), radial S-shaped beam (FIG. 5D), radial dual beam (FIG. 5E), radial curved dual beam (FIG. 5F), radial folded beam (FIG. 5G) and peripheral dual beam (FIG. 5H). Other metal spring patterns may also be used provided they can provide the desired filter characteristics.

Figure 6:
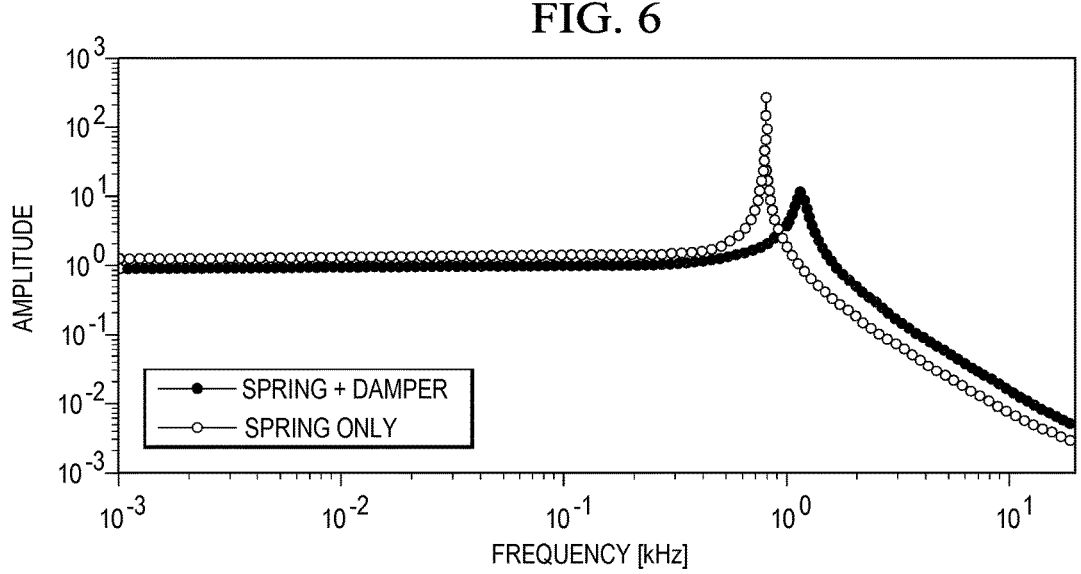
FIG. 6 is a plot showing example frequency responses of a simulated mechanical suspension system that includes only metal springs and a simulated mechanical suspension system that includes metal springs and dampers.

FIG. 6 is a plot showing example frequency responses of a simulated mechanical suspension system that includes only metal springs and a simulated mechanical suspension system that includes metal springs and dampers. In these example simulations, the mechanical suspension systems include metal springs with radial L-shaped beam patterns, as shown in FIG. 5B. As shown by the plot, the mechanical suspension system with only the metal spring (no dampers) has a resonant frequency at about 786 Hz. When the damper is incorporated, the resonant frequency can increase to about 1131 Hz, but the vibration amplitude is attenuated by a factor of about 22.

As described herein, a mechanical low pass filter for motion sensors can provide out-of-band vibration attenuation in the out-of-plane direction as well as package strain isolation. The mechanical suspension structure can be made from any material that can be deposited with thin-film deposition technology. The materials include but are not limited to: copper, copper alloy, aluminum, aluminum alloy, iron, silicon, nickel and nickel alloy. The mechanical suspension system utilizes damping material to further attenuate the resonance behavior of the mechanical filter. The basic structure design for the mechanical filter can be manufactured in a sensor package.

Figure 7:
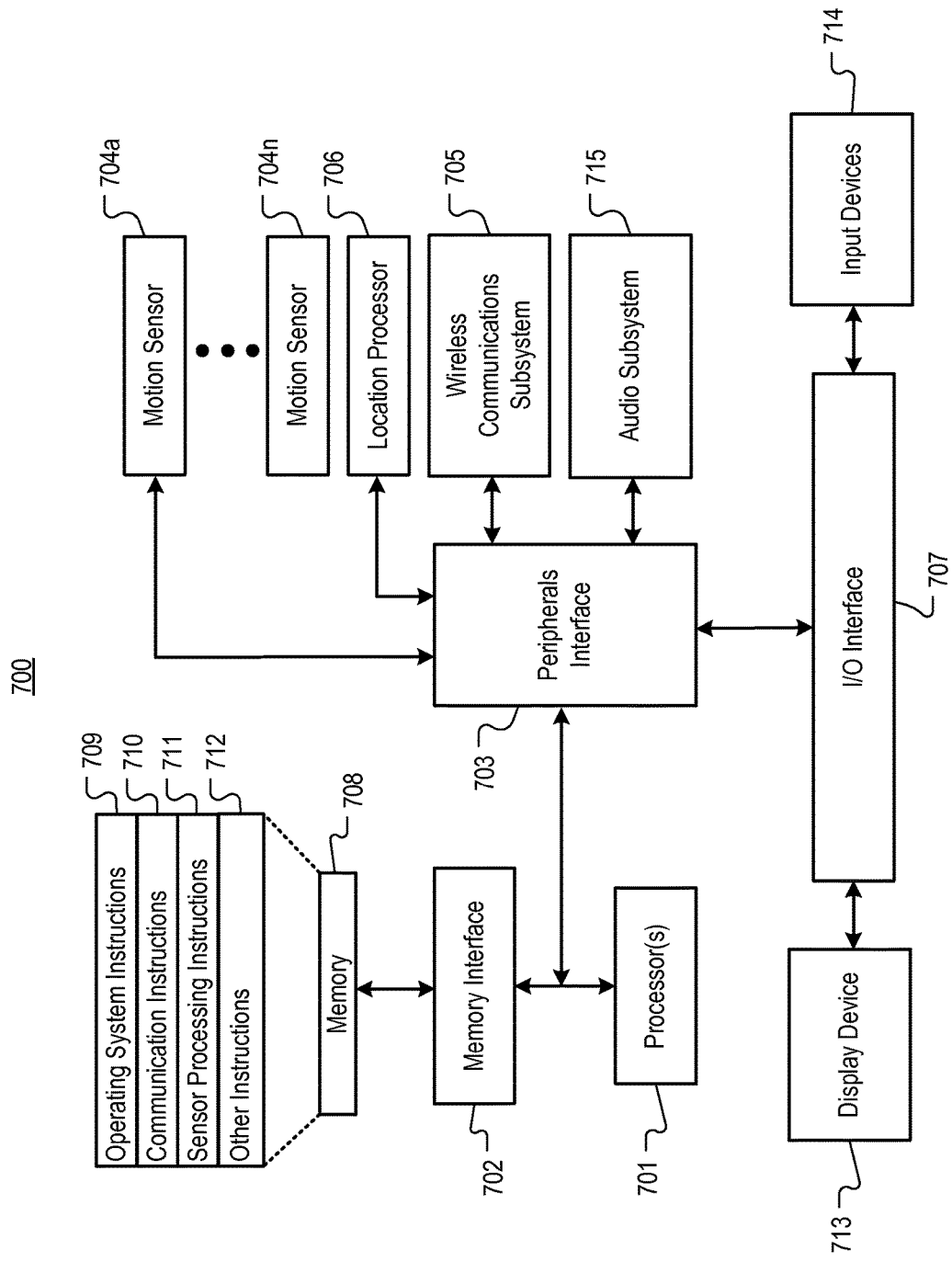
FIG. 7 is example apparatus that includes a motion sensor as described in reference to FIGS. 1-6.

FIG. 7 is example apparatus that includes one or more motion sensors, as described in reference to FIGS. 1-6. In some implementations, motion sensor packages 200, 211, or 300 can be implemented in an apparatus, such as smart phone, tablet computer, wearable computer and the like. The apparatus can have a system architecture 700 that includes processor(s) 701, memory interface 702, peripherals interface 703, one or more motion sensors 704a-704n, wireless communication subsystem 705, audio subsystem 715, Input/Output (I/O) interface 707, memory 708, display device 713 and input devices 714.

Motion sensors 704a-704n (e.g., MEMS accelerometer, MEMS gyro) may be coupled to peripherals interface 703 to facilitate multiple motion sensing functionalities of the apparatus. Location processor 706 can include a global navigation satellite system (GNSS) receiver. Wireless communications subsystem 705 may include radio frequency (RF) receivers and transmitters (or RF transceivers) and/or optical (e.g., infrared) receivers and transmitters. Wireless communication subsystem 705 can operate over a variety of networks, such as global system for mobile communications (GSM) network, GPRS network, enhanced data GSM environment (EDGE) network, IEEE 802.xx network (e.g., Wi-Fi, Wi-Max, ZigBee™), 3G, 4G, 4G LTE, code division multiple access (CDMA) network, near field communication (NFC) network, Wi-Fi Direct network and Bluetooth™ network.

I/O interface 707 may include circuitry and/or firmware for supporting wired mediums and implement various communication protocols and include ports for UART, Serial, USB, Ethernet, RS-232 and the like.

Memory interface 702 is coupled to memory 708. Memory 708 may include high-speed random access memory or non-volatile memory, such as one or more magnetic disk storage devices, one or more optical storage devices, or flash memory (e.g., NAND, NOR). Memory 708 may store operating system 709, such as Darwin, RTXC, LINUX, UNIX, OS X, iOS, WINDOWS, or an embedded operating system such as VxWorks. Operating system 709 may include instructions for handling basic system services and for performing hardware dependent tasks. In some implementations, operating system 709 may include a kernel (e.g., UNIX/LINUX kernel).

Memory 708 may also store communication instructions 710 to facilitate communicating with one or more additional devices in a network topology and one or more computers or servers over wired and wireless mediums. Communication instructions 710 can include instructions for implementing all or part of a wireless communications software stack.

Memory 708 may include sensor processing instructions 711 to facilitate motion sensor-related processing and functions on motion signals received from motion sensors 704a-704n.

Other instructions 712 can include instructions for a variety of applications that use the motion signals provided by motion sensors 704a-704n. For example, other instructions can include application instructions that take the motion signals from motion sensors 704a-704n and compute the current location, speed and orientation of the apparatus in a reference coordinate frame (e.g., geodetic, local level). The application instructions can display a map on display device 713 with a marker indicating the location of the apparatus along with other information such as turn-by-turn directions for a route. Audio subsystem 715 can provide speech output for the application that provides, for example, audible turn-by-turn directions.

Other applications can make other uses of motion signals from motion sensors 704a-704n and will benefit from motion signals that are less noisy and have less errors due to the mechanical filter designs disclosed herein. For example, an electronic pedometer application can benefit from improved motion signals provided by the mechanical filter designs disclosed herein.

While this document contains many specific implementation details, these details should not be construed as limitations on the scope of what may be claimed but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A motion sensor package comprising:
    a substrate;
    one or more mechanically compliant dampers, each having a bottom surface contacting a first surface of the substrate;
    one or more mechanically compliant metal springs, each having a first portion, a second portion, and a third portion, the first portion contacting the first surface of the substrate, the second portion contacting a top surface of the one or more mechanically compliant dampers, and the third portion extending past a first side surface of the one or more mechanically compliant dampers toward a periphery of the substrate, with the second portion being positioned between the first portion and the third portion; and a sensor stack including a motion sensor, the sensor stack having a first surface facing the first surface of the substrate and being attached to the third portion of the one or more mechanically compliant metal springs, wherein the one or more mechanically compliant metal springs and the one or more mechanically compliant dampers provide a mechanical suspension system that operates as a mechanical low-pass filter having a frequency response that combines with a frequency response of the motion sensor to provide an attenuated resonant peak at a resonant frequency of the motion sensor.

2. The motion sensor package of claim 1, wherein the third portion of the one or more mechanically compliant metal springs electrically couple the sensor stack to the substrate.

3. The motion sensor package of claim 1, wherein the sensor stack comprises:
   an integrated circuit die attached to the third portion of the one or more mechanically compliant metal springs; and
   the motion sensor attached to the integrated circuit die.

4. The motion sensor package of claim 3, wherein the one or more mechanically compliant metal springs are attached to the integrated circuit die with at least one of solder, conductive epoxy, and silicone.

5. The motion sensor package of claim 3, wherein the motion sensor is a micro-electro-mechanical system (MEMS).

6. The motion sensor package of claim 1, wherein the one or more mechanically compliant dampers are formed on the first surface of the substrate at locations that determine in part an overall stiffness and quality factor of the mechanical suspension system.

7. The motion sensor package of claim 1, wherein the one or more mechanically compliant metal springs are shaped so that the resonant frequency of the mechanical suspension system is higher than the sensing bandwidth of the motion sensor in the sensor stack and lower than the resonant frequency of the motion sensor.

8. The motion sensor package of claim 7, wherein at least one of the one or more mechanically compliant metal springs is a radial straight beam spring.

9. The motion sensor package of claim 7, wherein at least one of the one or more mechanically compliant metal springs is a radial L-shaped beam spring.

10. The motion sensor package of claim 7, wherein at least one of the one or more mechanically compliant metal springs is a radial asymmetrical L-shaped spring.

11. The motion sensor package of claim 7, wherein at least one of the one or more mechanically compliant metal springs is a radial S-shaped spring.

12. The motion sensor package of claim 7, wherein at least one of the one or more mechanically compliant metal springs is a radial dual beam spring.

13. The motion sensor package of claim 7, wherein at least one of the one or more mechanically compliant metal springs is a radial curved dual beam spring.

14. The motion sensor package of claim 7, wherein at least one of the one or more mechanically compliant metal springs is a radial folded beam spring.

15. The motion sensor package of claim 7, wherein at least one of the one or more mechanically compliant metal springs is a peripheral dual beam spring.

16. The motion sensor package of claim 1, wherein the one or more mechanically compliant metal springs includes a fourth portion between the first portion and the second portion that is spaced apart from a second side surface of the one or more mechanically compliant dampers.

17. An apparatus comprising:
   a motion sensor including:
      a substrate;
      one or more mechanically compliant dampers, each having a bottom surface contacting a first surface of the substrate;
      one or more mechanically compliant metal springs, each having a first portion, a second portion, and a third portion, the first portion contacting the first surface of the substrate, the second portion contacting a top surface of the one or more mechanically compliant dampers, and the third portion extending past a first side surface of the one or more mechanically compliant dampers toward a periphery of the substrate, with the second portion being positioned between the first portion and the third portion; and
      a sensor stack including a motion sensor, the sensor stack having a first surface facing the first surface of the substrate and being attached to the third portion of the one or more mechanically compliant metal springs, wherein the one or more mechanically compliant metal springs and the one or more mechanically compliant dampers provide a mechanical suspension system that operates as a mechanical low-pass filter having a frequency response that combines with a frequency response of the motion sensor to provide an attenuated resonant peak at a resonant frequency of the motion sensor; and
   memory coupled to the processor and configured to store instructions, which when executed by the processor, causes the processor to perform operations comprising:
      obtaining a motion signal from the motion sensor; and
      determining one or more of position, velocity, speed or orientation of the apparatus based at least in part on the motion signal.

18. The apparatus of claim 17, wherein the one or more mechanically compliant metal springs electrically couple the sensor stack to the substrate.

19. The apparatus of claim 17, wherein the sensor stack comprises:
   an integrated circuit die attached to the third portion of the one or more mechanically compliant metal springs; and
   the motion sensor attached to the integrated circuit die.

20. The apparatus of claim 17, wherein the one or more mechanically compliant dampers are formed on the first surface of the substrate at locations that determine in part an overall stiffness and quality factor of the mechanical suspension system.

21. The apparatus of claim 17, wherein the one or more mechanically compliant metal springs are shaped so that the resonant frequency of the mechanical suspension system is higher than the sensing bandwidth of the motion sensor in the sensor stack and lower than the resonant frequency of the motion sensor.

22. The apparatus of claim 17, wherein the one or more mechanically compliant metal springs includes a fourth portion between the first portion and the second portion that is spaced apart from a second side surface of the one or more mechanically compliant dampers.

\* \* \* \* \*